United States Patent

Wunderlich

[11] Patent Number: 5,833,899
[45] Date of Patent: Nov. 10, 1998

[54] METHOD FOR THE PREPARATION OF METHOD ARTICLES BY SINGLE AND MULTI-LAYER COMPRESSION AND APPARATUS THEREFOR

[76] Inventor: Ernst Dieter Wunderlich, 55 Green Valley Dr., Warren, N.J. 07059

[21] Appl. No.: 935,948

[22] Filed: Sep. 23, 1997

[51] Int. Cl.[6] .......................... B29C 45/16; B29C 45/22
[52] U.S. Cl. .................. 264/40.4; 264/297.2; 264/328.8; 264/328.19; 264/245; 425/130; 425/558; 425/561; 425/572
[58] Field of Search .............................. 264/40.4, 297.2, 264/328.4, 328.8, 328.19, 241, 245; 425/130, 557, 558, 559, 561, 562, 567, 572, 586, 588

[56] References Cited

U.S. PATENT DOCUMENTS

| | | | |
|---|---|---|---|
| 3,020,591 | 2/1962 | Breher et al. | 425/558 |
| 3,241,192 | 3/1966 | Nouel | 425/558 |
| 3,245,115 | 4/1966 | Ecklund | 425/558 |
| 4,080,147 | 3/1978 | Dumortier | 425/551 |
| 4,256,689 | 3/1981 | Gardner | 425/558 |
| 4,808,101 | 2/1989 | Schad et al. | 425/130 |
| 5,221,507 | 6/1993 | Beck et al. | 264/328.19 |
| 5,227,181 | 7/1993 | Knudsen | 264/328.8 |
| 5,229,144 | 7/1993 | Kuntz | 264/328.19 |
| 5,403,178 | 4/1995 | Steger | 425/559 |
| 5,662,856 | 9/1997 | Wunderlich | 264/297.2 |

Primary Examiner—Jill L. Heitbrink
Attorney, Agent, or Firm—Edward M. Fink

[57] ABSTRACT

One or several molten materials are extruded at low pressure from one or several continuous plasticizers through central stationary nozzles via individually circumferential flow passages of common distribution spools directly into individual extendable transfer reservoirs. From there, the molten materials are transferred in a continuous cascading manner into secondary transfer reservoirs to be subsequently transferred and condensed within mold cavities into finished molded articles. The central stationary nozzles and stationary primary displacement plugs are grooved with lateral longitudinal melt-flow channels to allow the conveyance of molten materials across intersecting molten material passage ways during the extending movement of the manifold assembly. The molten materials are conveyed through secondary displacement plugs into secondary transfer reservoirs by external cylinders, retracting the manifold assembly on adjustable-length spacer rods in unison against the stationary primary displacement plugs. Compensation rods, built into the stationary distribution plugs regulate the volume relative to each transfer reservoir and can monitor the sequence of different molten material transfers. The cylinder strokes are variable to create finished articles at different weights. Multiple molten materials are united during the tertiary transfer phase by passing across multilayer die crowns and die cones, embedded in tertiary distribution spools of a tertiary manifold assembly.

6 Claims, 5 Drawing Sheets

METHOD FOR THE PREPARATION OF METHOD ARTICLES BY SINGLE AND MULTI-LAYER COMPRESSION AND APPARATUS THEREFOR

FIELD OF THE INVENTION

The present invention relates to a method for the preparation of preforms and molded articles from single and multi-layer molten materials and to an apparatus therefor. More particularly, the present invention relates to a method and apparatus for the introduction of one or several molten materials into cascading transfer reservoirs in a continuous unidirectional flow direction and from there into mold cavities. The invention further relates to differential volume correction within common transfer reservoirs for the purpose of balancing the volume of molten materials to each other or to delay the transfer of one molten material in relation to another.

BACKGROUND OF THE INVENTION

In conventional prior art molding systems described heretofore, molten material is injected via a hot runner manifold into a plurality of shooting pots in the manner described in U.S. Pat. Nos. 4,717,324, 4,775,308, 4,808,101, 4,863,369, and 4,931,234. Upon completion of the metering phase, molten materials are injected into mold cavities through narrow nozzle passages. Such techniques have a drawback in that the molten material, which is first introduced into the shooting pots, is evacuated last. Attempts to obviate the limitations of these techniques are exemplified by the method described in U.S. Pat. No. 5,112,212. The patentee discloses the use of a rotating piston cylinder being movable to effect either a valve or metering action. In U.S. Pat. No. 5,200,207, a floating piston, driven by molten material from the opposite working surface, injects molten material into mold cavities under high pressure through the narrow passages of the nozzles in an alternating motion.

U.S. Pat. Nos. 3,032,810, 3,503,095, 3,503,099, 3,590,114, and 3,685,941 disclose methods wherein molten material is conveyed into variable volume chambers. Center pins then open passages between variable-volume chambers and fixed volume mold parts. The first and second mold parts are then moved jointly to reduce the volume of the chambers and thereby displace plasticized material through the gate opening into the mold cavities. Upon completion of the displacement phase, center blocking plungers close the gates to the mold cavities so that the melt chambers can be refilled. The drawback of this technique resides in the fact that the main melt passage way is not positively blocked prior to the displacement phase by independent means to assure that no molten material can flow back into the extruder. The blocking plungers close the entrance gates to the mold cavity immediately after the displacement phase is completed, thereby permitting the recharge of the chambers with molten material. In this technique, both the mold cavities and the closed gates prohibit further packing and hold the molten material during the cooling and shrinking phases which are required to ascertain dimensional integrity of the finished hollow or molded article.

The entirety of the mold cavities are being pressed against the variable volume chambers.

Multi-layer nozzles, as disclosed in U.S. Pat. No. 4,863,665, U.S. Pat. No. 4,895,504, U.S. Pat. No. 5,098,274, U.S. Pat. No. 5,131,830, or U.S. Pat. No. 5,254,395 comprise interfitting shells in which each nozzle passage has a separate gate and a common gate pin. This technique and the apparatus employed therewith require control of the molten material flows through sophisticated timing devices which introduce the different molten materials which are dependent upon pressure differentials within the nozzle assembly.

SUMMARY OF THE INVENTION

It is an object of the present invention to fill transfer reservoirs with molten material in a continuous cascading motion. Differential compensation rods, built into the stationary displacement plugs regulate the volume in each primary transfer reservoir from each other, whereby external moving devices, such as cylinders or timing screws, extend the manifold block away from the stationary center nozzles and the primary stationary displacement plugs. Upon completion of the filling phase, the primary distribution spools are shifted to block the molten material passages between the stationary center nozzles and primary transfer reservoirs. Secondary distribution spools are then shifted to open their circumferential passage ways, the external cylinders retract the manifold block assembly, and the molten material is transferred into secondary transfer reservoirs through the passage ways within the secondary displacement plugs in a linear cascading direction. Upon completion of the secondary transfer phase, the same external moving devices extend again and move the secondary displacement plugs within the secondary manifold assembly to transfer and condense the molten material into mold cavities to form finished molded articles.

It is still a further object of the present invention to have the secondary stationary displacement plugs serve as moltenmaterial channels with off-center exit ports away from the center gates in the mold cavity bottoms.

It is yet a further object of the present invention to have the foremost portion of the secondary stationary displacement plugs mate with the bottom contours of traditional nozzle seats below the mold cavities, after transferring and condensing the molten material into the corresponding mold cavities, to close off the bottom gates of the same mold cavities at close proximity without causing gate crystallinity because of the absence of hot valve stems prior to opening the mold cavities and releasing the finished molded articles.

It is a further object of the present invention to provide a method and apparatus for the formation of multi-layer molded articles by extruding several molten materials at low pressure in a continuous cascading manner through central stationary nozzles with longitudinal melt passage grooves and multi-stationary distribution spools into primary variable-volume transfer reservoirs, located within a reciprocating manifold assembly, then into secondary variable-volume transfer reservoirs and, consequently, across a tertiary manifold assembly with embedded multilayer die crowns in a continuous cascading manner into mold cavities via short melt flow channels to be condensed into their final configuration.

A further object of the present invention is the transfer of a multitude of molten materials from primary differential-volume transfer reservoirs into secondary differential-volume transfer reservoirs across a series of primary, secondary, and tertiary distribution spools into mold cavities. Multi-layer die crowns with varying circular die gaps and nozzle cones, built into the central tertiary set of distribution spools, unite the molten materials from multiple sources and transfer the created multi-layer material structure into the mold cavities to form finished multi-layer articles.

It is a further object of the present invention to embed gate cones and multi-layer die crowns comprising a series of concentric ring gaps interrupted with inlet openings in their respective bottom bases connecting to molten material tunnels and a multitude of circumferential passage ways in a central tertiary distribution spool. Molten materials of different sources are then conveyed across the circular apertures of the multi-layer die crowns and are united into a multi-layer structure in the gate cones and same multi-layer structure is transferred and condensed in corresponding mold cavities.

It is still a further object of the present invention to monitor the transfer of molten material by means of programmable transfer cylinders or timing screws which slide the mold manifold block and the secondary displacement plugs on adjustable-length spacer rods in a reciprocating movement.

It is a further object of the present invention to incorporate a spacer block between the secondary transfer reservoirs and mold cavities, which contains a multitude of distribution spools transferring molten material from a multitude of transfer reservoirs into a lesser or larger number of mold cavities in a continuous unidirectional flow direction.

BRIEF OF THE INVENTION

In the present invention, molten material is extruded through stationary central nozzles with lateral longitudinal grooves reaching into a mold manifold assembly during the extending movement of the same via primary distribution spools around their circumferential lateral molten material channels along grooved side walls of stationary displacement plugs and exits from the foremost points of said plugs into the transfer reservoirs in a continuous unidirectional flow direction The longitudinal grooves in the central stationary nozzles and the longitudinal grooves in the side walls of the stationary primary displacement plugs assure the intersection of the molten material passage ways in the primary manifold assembly during its reciprocating movements. Simultaneously, or after the first cycle, consecutively, the primary mold manifold assembly and secondary displacement plugs approach the closed mold cavities to transfer and condense the 'molten material into finished molded articles. Upon completion of the metering phase, the primary distribution spools close off the molten material passages between the plasticizer, the central stationary nozzle, and primary transfer reservoirs. The secondary distribution spools are then shifted to open the molten material passages toward the mold cavity assembly. The primary mold manifold assembly, together with the secondary displacement plugs, are then drawn in unison against the stationary primary displacement plugs and away from the fixed-position mold cavity assembly. The molten material is then transposed from the primary transfer reservoirs into the secondary transfer reservoirs via the circumferential grooves of secondary distribution spools, across large gate passages and internal molten material passages in the secondary displacement plugs in a continuous, unidirectional and cascading flowing motion. Upon completion of the transfer phase, the secondary distribution spools are shifted again for their land areas to close off the passages between the secondary transfer and the primary transfer reservoirs. The mold manifold assembly, together with the secondary displacement plugs, are then approached by an external moving means assembly towards the fixed-position mold halves and the just transferred molten material is condensed, packed, and held into finished molded articles. The metering stroke of the external moving means assembly is programmable and the lengths of the spacer rods is adjustable to vary the volumecondensing holding phase during forming of the finished articles in the same mold cavity assembly. During the molten-article-forming phase, the primary distribution spools are shifted again to open the circumferential molten material passages and, simultaneously, or at an independent time interval to minimize the residence time molten material is again extruded under low pressure into the primary transfer reservoirs in a continuous, unidirectional flow motion. Compensation rods, located within the stationary displacement plugs, monitor the amount of molten material relative to each primary transfer reservoir.

Once the finished hollow articles are sufficiently solidified, the mold-cavity assembly opens. Either a robotic device enters between the mold halves, and the finished molded articles are ejected into a conventional end of arm tooling or a transfer plate rotates or shuttles the same out of the molding area for further cooling, conditioning, or blowing. When the robot or transfer plate, carrying the finished molded articles, has moved out of the mold halves, the mold-cavity assembly closes again and a new cycle begins.

The described low-pressure method and apparatus requires lesser clamp tonnage pressures as compared to conventional injection molding systems due to short, large flow and gate passages and the absence of small pin gates and valve stems. Thus, a larger number of mold cavities, particularly wide-mouth neck mold cavities, can run in faster cycling lower clamp tonnage molding machines. In addition, the tooling maintenance costs are reduced. The molten materials are transferred at lower shear rates and pressures due to continuous extrusion directly into individual smaller transfer reservoirs within the mold manifold assembly instead of injecting the total premetered volume into the cavities at high velocity from a large central external reciprocating screw extruder or a common large shooting pot, thus maintaining the molten material characteristics, reducing acetaldehyde generation, and cooling times, as well as energy consumption and resulting in improved shelf-life periods for the finished articles. The plasticizing phase can either occur immediately after the molten material has been transferred out of the primary transfer reservoirs and during the condensing and holding phase or can be delayed to minimize the residence time in the transfer reservoirs. This extra available process flexibility essentially permits one to turn the plasticizing screw at a lower rpm or utilize smaller size plasticizers with less melt phase inventory and lower procurement cost. The larger plasticizing capacity of the continuous rotating extruder allows one to expand the output capacity of this low-pressure molding system through stack molds. The linear slicing movement of the distribution spools within the mold manifold block closes the gates without causing crystallization in these areas, thus minimizing any gate vestige. The positive separation of the molten material by the distribution spools eliminates the time necessary for decompression and suck-back in traditional molding systems and the low-pressure method virtually prevents any molten material seepage between the mold manifold block assembly, the distribution spools, displacement plugs, and central stationary nozzles, thus assuring close volume control of the molten material. Thermoinsulation means between the hot mold manifold block and cold mold cavities assures solidification of the molten material in the gate areas and avoids molten material drooling during mold opening.

DETAILED DESCRIPTION OF THE INVENTION

In accordance with the present invention, a low-pressure molded article forming method and apparatus is described wherein one or several molten materials are extruded under low pressure from one or several continuous plasticizers through central stationary nozzles with lateral grooves which allow the filling of a multitude of primary transfer reservoirs of equal or different volume capacity during the extending movement of the primary mold manifold assembly. Lateral grooves in the stationary displacement plugs allow the molten material or materials to fill the transfer reservoirs on a first-in, first-out basis during the extending movement of the primary mold manifold assembly with its built-in transfer housings. A subsequent retracting movement of the primary manifold assembly conveys the same molten materials through the internal passage ways of secondary displacement plugs into a secondary set of transfer reservoirs. Common adjustable spacer rods regulate the manifold assembly stroke and thus the total shot volume. Compensation rods built into the primary stationary displacement plugs are extendable or retractable to monitor the volume for the molten material in relation to each primary transfer reservoir. During the extending movement of the primary mold manifold assembly, the secondary displacement plugs, mounted onto the same, are approached toward the mold-cavity portion by means of common transfer cylinders or timing screws to fill and condense the previously transferred molten material or materials into finished molded articles.

Figure 1:
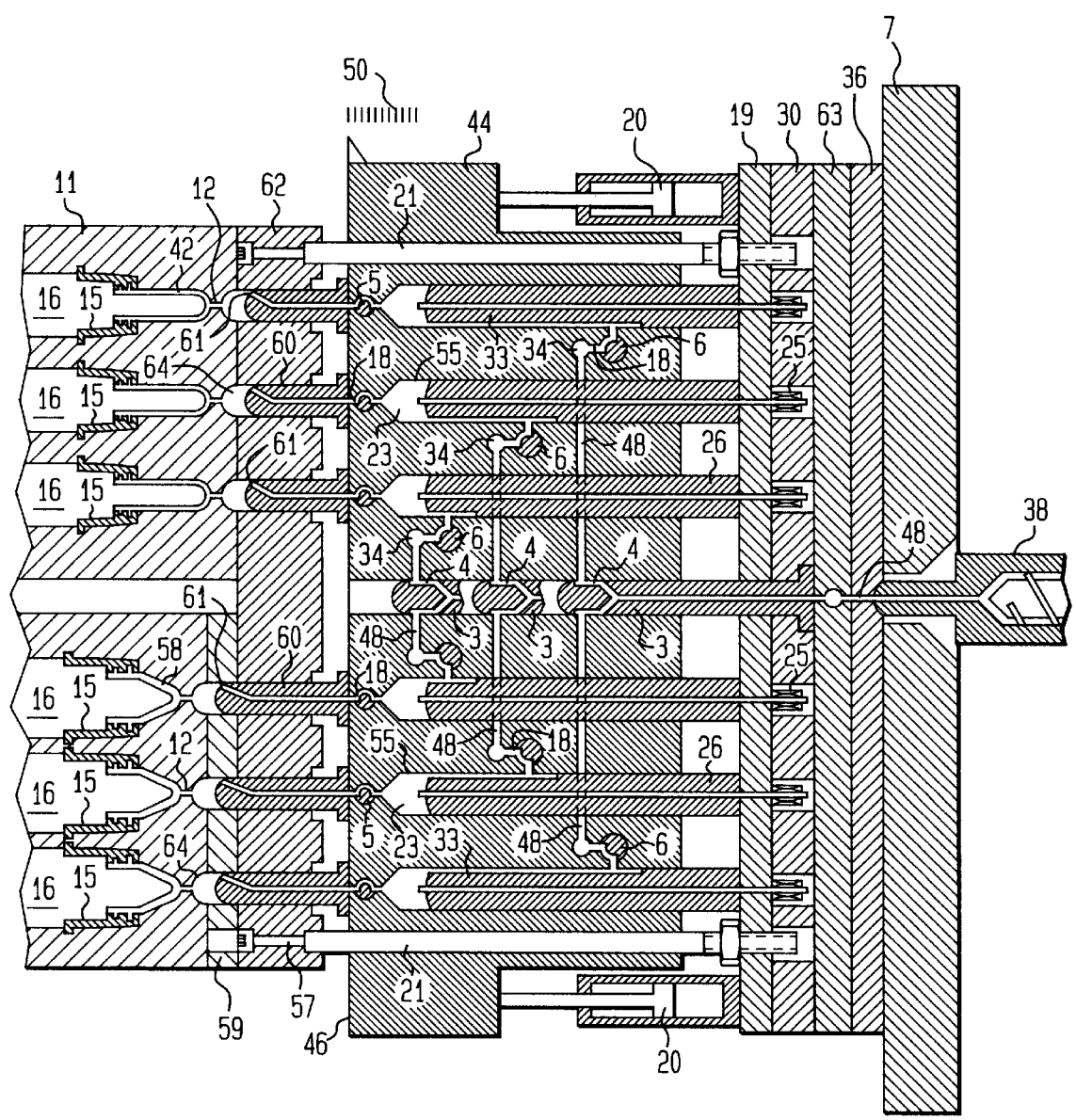
FIG. 1 is a top view of manifold assemblies with center nozzles, primary and secondary transfer reservoirs, as well as mold cavity assemblies capable of producing different molded articles.

With reference now more particularly to the drawing, FIG. 1 is a top view of a mold and manifold assembly consisting of a primary manifold assembly 44 with stationary center nozzles 3, primary and secondary transfer reservoirs 23 and 64, a secondary manifold assembly 62, and mold cavity assembly 11 adapted for different shape molded articles 42 and 58. Plasticizer 38, located between fixed platen 7 of a molding machine (not shown) abuts against a mold base plate 36 with a molten material runner 48 leading to the multi-center-nozzle distribution plate 63. A multitude of stationary center nozzles 3 are mounted on multi-center-nozzle distribution plate 63. Lateral grooves 4 of the stationary center nozzles 3 intersect with their respective melt passages 48 allowing molten material to be conveyed during the expanding movement of the mold manifold assembly 44.

Manifold assembly 44 is expanded by a multitude of transfer cylinders 20 in a programmed fashion 50 according to the desired molten material volume. Independently, or simultaneously, molten material is being extruded through main hot runners 34 around the circumferential melt passages 18 of the primary distribution spools 6 along lateral grooved runners 33 built into individually heated stationary displacement plugs 26 into primary transfer reservoirs 23. Built-in compensation rods 25 adjust the molten material volume between each transfer reservoir 23.

Upon completion of the filling phase of the primary transfer reservoirs 23 the primary distribution spools 6 close off the melt stream coming from plasticizer 38. The secondary distribution spools 5 are then shifted to open their circumferential molten-material passages 18 towards the secondary manifold assembly 62, held onto adjustable spacer rods 21 with mounting bolts 57. Transfer cylinders 20 retract and the molten material is transferred in a direct cascading manner through the melt passages of the secondary displacement plugs 60, bolted onto the manifold surface 46 of the primary manifold assembly 44, and exit through the off-center ports 61 into secondary transfer reservoirs 64. A mold cavity assembly 11 is mounted onto the secondary manifold assembly 62. In case the finished molded articles 42 and 58 are of different lengths, a spacer plate 59 is being incorporated between the secondary manifold assembly 62 and mold cavity assembly 11.

Upon completion of the molten material transfer phase from the first into the second transfer reservoirs 23 and 64, the secondary distribution spools 5 close off, and the primary distribution spools 6 open towards the respective melt passages 48. The transfer cylinders 20 then extend again the manifold assembly 44, sliding on the spacer rods 21. New molten material is then extruded into the primary transfer reservoirs 23 while the secondary displacement plugs 60 are forwarded by the same transfer cylinder movement towards the gate opening 12 of the mold cavity assembly 11 and convey the molten material in between the mold cavity assembly 11, core pins 16, and neck rings 15, forming the finished articles 42 and 58. Due to the off-center exit ports 61 in the secondary displacement plugs 60 when bottoming out, the plugs 60 close gates 12 of mold cavity assembly 11 after completion of the filling, packing and holding phases, thereby allowing the solidified finished articles 42 and 58 to be released upon mold opening.

Figure 2:
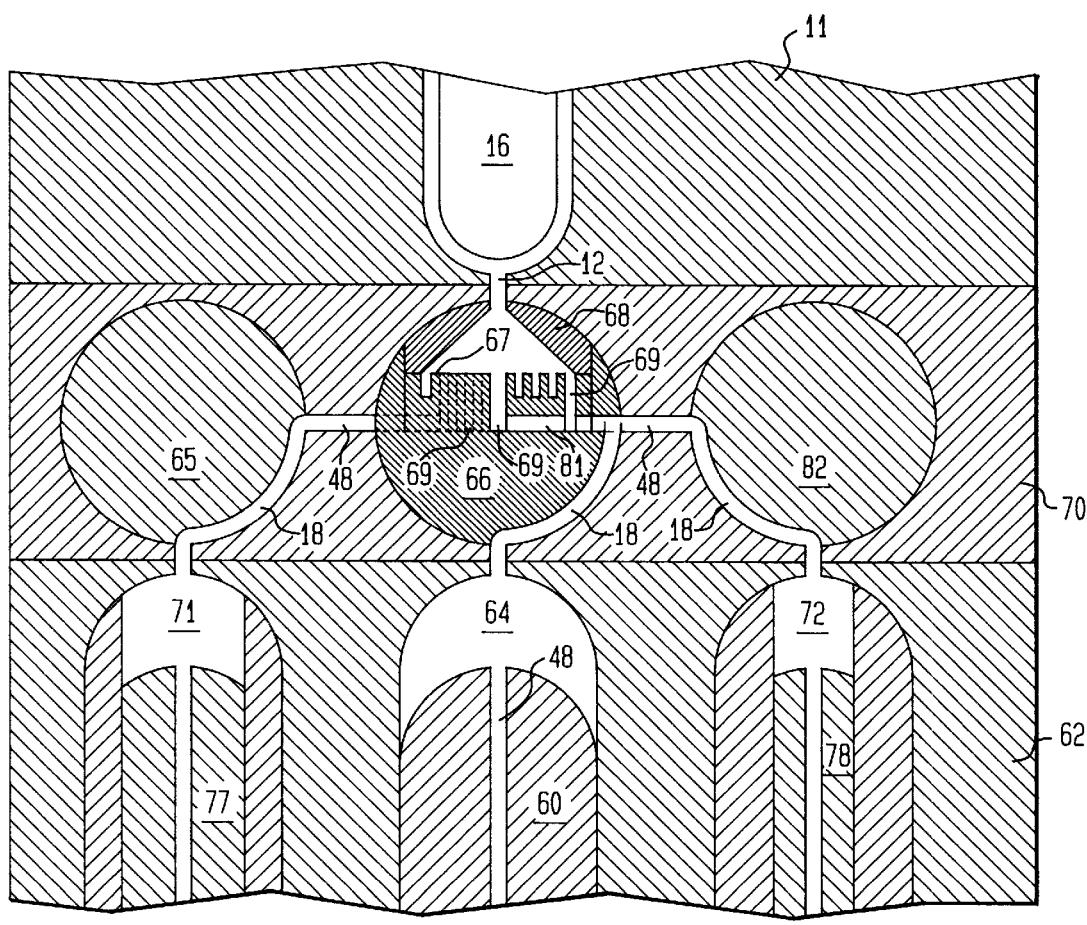
FIG. 2 is a cross-sectional view of a tertiary manifold assembly with a multi-layer die crown and a nozzle cone embedded in central tertiary distribution spools and secondary transfer reservoirs.

FIG. 2 is a side view of a secondary manifold 62 with different-size secondary transfer reservoirs 71, 64 and 72 due to different-diameter secondary displacement plugs 77, 60 and 78, respectively, with central molten material passages 48 to store different molten materials of different volume prior to being transferred across the circumferential molten material passages 18 of lateral tertiary distribution spools 65 and 82 and central tertiary distribution spool 66 along their molten material tunnel passages 81 which end at respective bottom inlet ports 69 across a multilayer die crown 67 and die cone 68, both embedded in the central tertiary distribution spool 66, located in the tertiary manifold 70, to form a circular multilayer molten material structure to be transferred through gate opening 12 into mold cavity assembly 11 around core pin 16.

Figure 3:
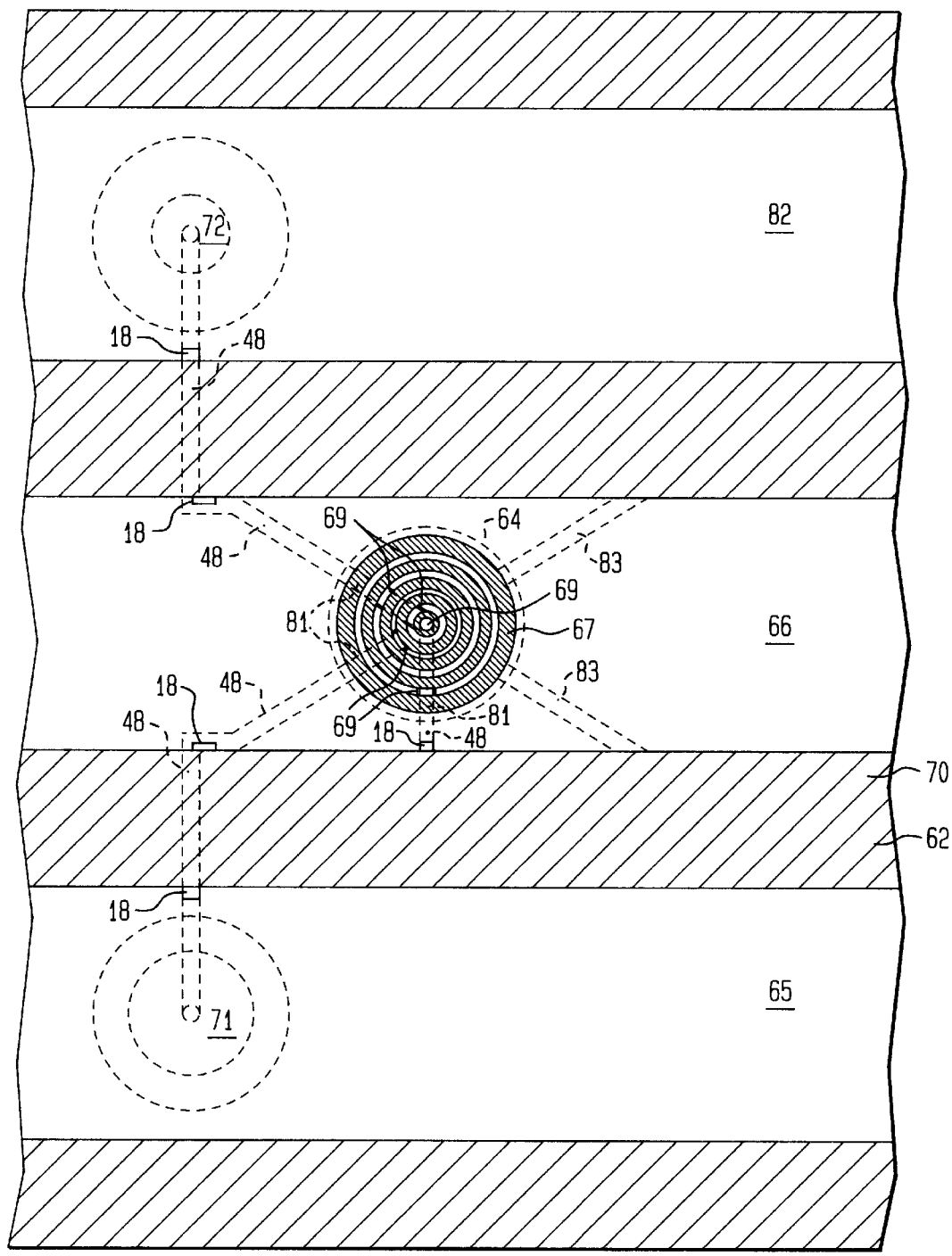
FIG. 3 is a top view of a tertiary manifold assembly with a multi-layer die crown embedded in a tertiary central distribution spool and lateral tertiary distribution spools.

FIG. 3 is a top view of tertiary central and lateral distribution spools 66, 65 and 82 mounted in a tertiary manifold 70 and secondary transfer reservoirs of different volume 64, 71 and 72 mounted into a secondary manifold assembly 62 beneath. The circumferential melt passages 18 of the tertiary central distribution spool 66, 65 and 82 intersect with the molten material passages 48 and the tunnel passages 81 beneath the multilayer die crown 67, which end at their respective bottom inlet ports 69 for the molten materials to pass through to form a multilayer ring structure. Additional molten material tunnel passages 83 allow the number of multilayers to increase by embedding different multilayer crowns (not shown).

Figure 4:
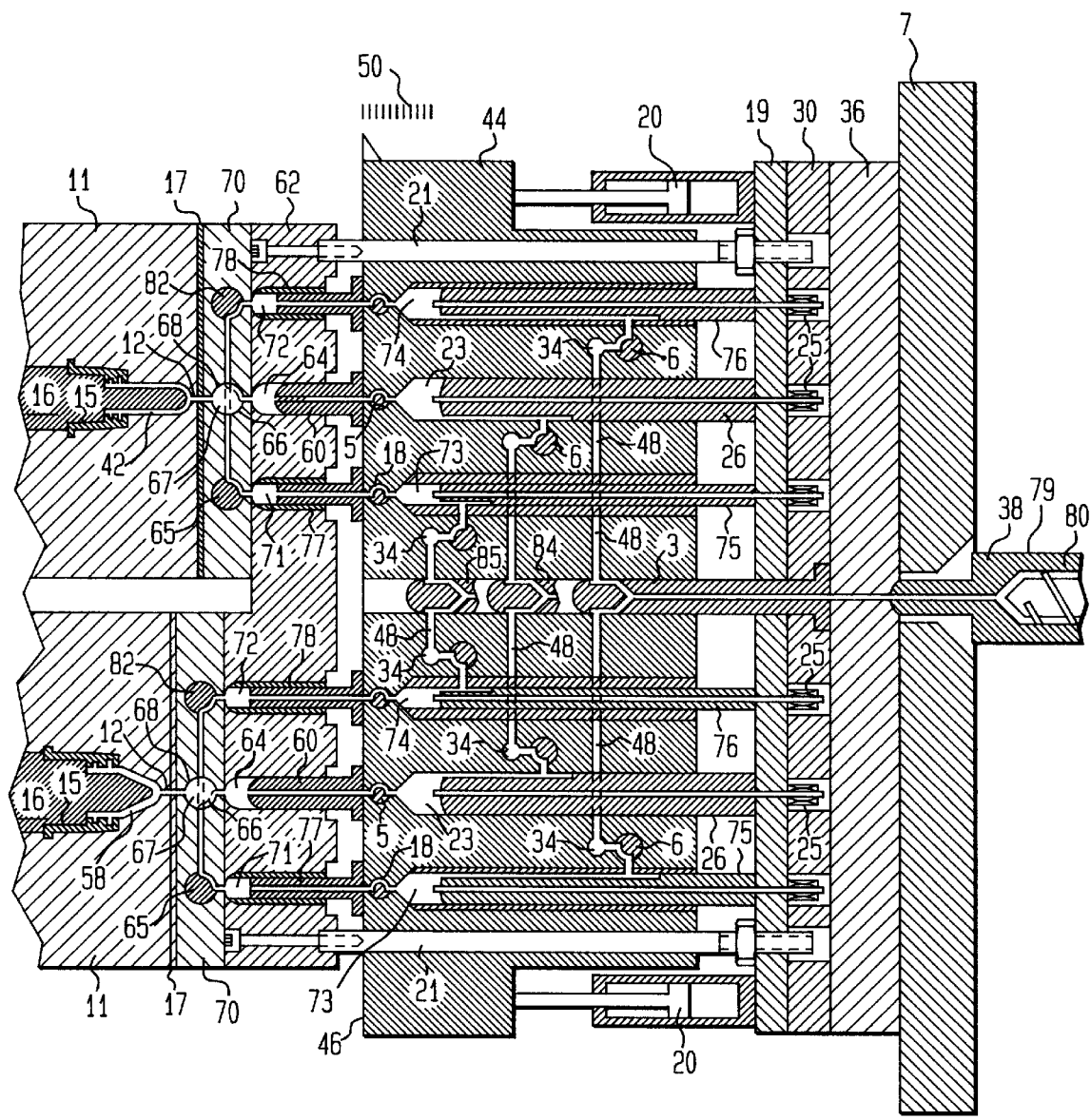
FIG. 4 is a top view of a multi-layer manifold assembly with primary and secondary transfer reservoirs of different volume, primary, secondary, and tertiary distribution spools, as well as mold cavity assemblies for producing multi-layer molded articles.

FIG. 4 is a top view of manifold assemblies 44, 62 and 70, wherein a multitude of plasticizers 38, 79 and 80 extrude different molten materials across a mold base plate 36 through separate stationary central nozzles 3, 84 and 85 across hot runners 34 and primary distribution spools 6 into primary transfer reservoirs 23, 73 and 74 of proportionally different volume while the transfer cylinders 20 extend the primary manifold assembly 44 sliding on the adjustable spacer rods 21 away from the stationary displacement plugs with different diameters 26, 75 and 76 and volume-adjustable compensation rods 25. The secondary distribution spools 5, shown in FIG. 4 in an open position, are closed during this process phase to enable the filling of different molten materials independently into the primary transfer reservoirs of different diameters 23, 73 and 74. The secondary displacement plugs with corresponding different volume 60, 77 and 78, mounted on the surface 46 of the primary manifold assembly 44, are advanced by the same movement of the transfer cylinders 20 to convey previously transferred molten materials from the primary transfer reservoirs 23, 73 and 74 into secondary transfer reservoirs 64, 71 and 72 of the secondary manifold assembly 62 mounted onto the adjustable spacer rods 21, and, subsequently, via tertiary lateral distribution spools 65 and 82 into a tertiary central distribution spools 66 across the multilayer die crowns 67, through the die cones 68 located in the tertiary manifold block 70 through the gates 12 into the mold cavity body assemblies 11 around the core pins 16 and neck rings 15 to form the finished multilayer articles 42 and 58.

After the filling, packing, and holding phase, the tertiary central distribution spools 66 are shifted for their respective land areas to close off the molten materials within the die cone 68 from the mold cavity gate 12 to enable the core pins 16 and neck rings 15 to lift the finished multilayer articles 42 and 58 out of the stationary mold cavity assembly 11. A thermoinsulating plate 17 separates the cold mold cavity assembly 11 from the hot tertiary manifold assembly 70.

Figure 5:
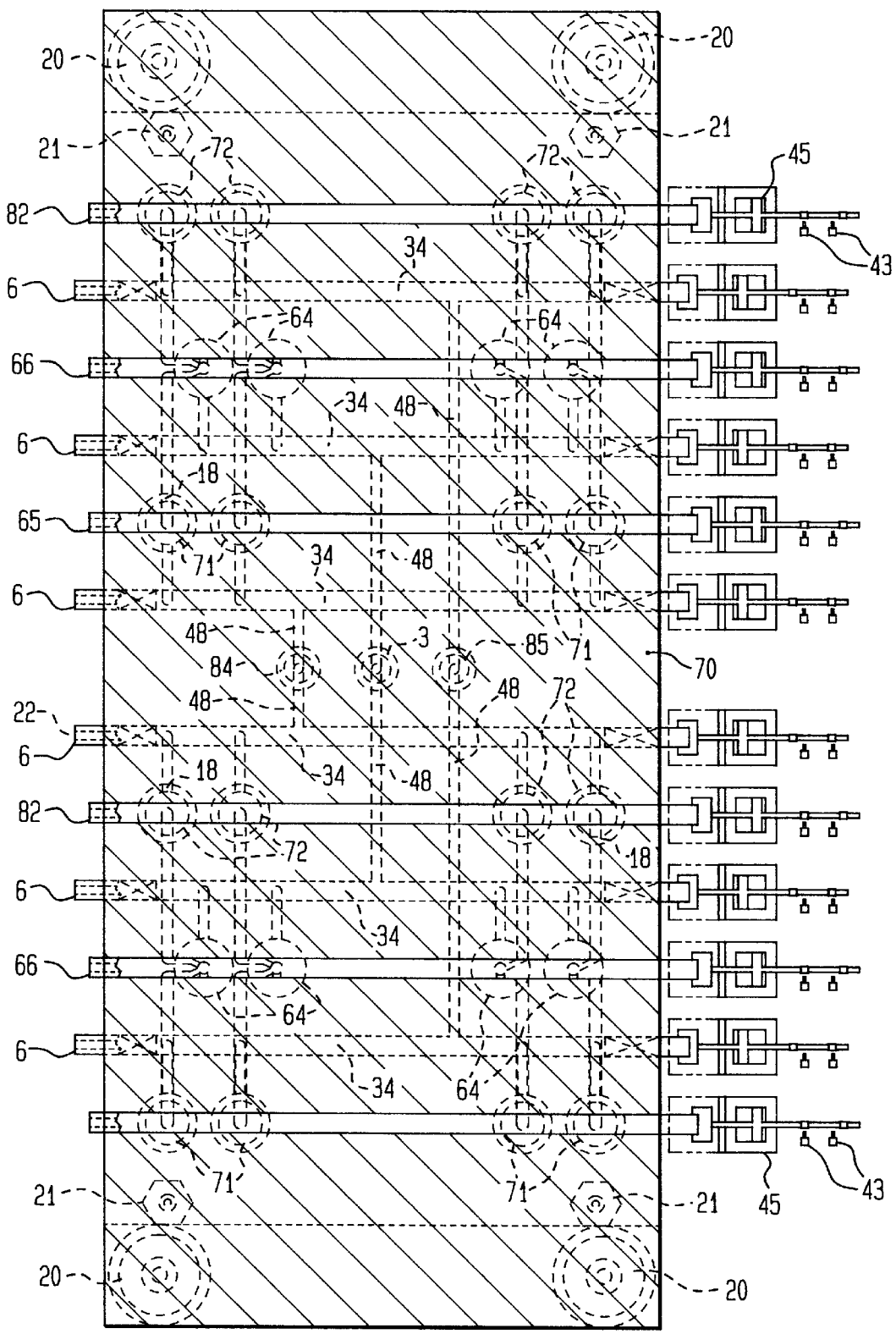
FIG. 5 is a top view of a manifold assembly with center nozzles, primary and tertiary distribution spools, transfer reservoirs, manifold-block-moving means, and spacer rods.

FIG. 5 is a top view of a tertiary manifold assembly 70 with a secondary and primary manifold assembly not shown, disposed directly beneath the tertiary manifold assembly 70, individual stationary central nozzles 3, 84 and 85 which convey different molten materials across the intersecting melt passages 48, the hot runners 34, across the primary distribution spools 6 beneath into primary transfer reservoirs (not shown) and via secondary distribution spools (not shown) into secondary transfer reservoirs 64, 71 and 72 in a continued cascading flow direction.

The primary manifold assembly, together with the secondary displacement plugs (not shown), is extended and retracted by a multitude of transfer cylinders 20 to convey the molten material, extruded from the different plasticizers (not shown) to the mold cavity assemblies (not shown). The primary manifold assembly slides on adjustable spacer rods 21. The secondary manifold assembly is bolted onto the end of the adjustable spacer rods 21. All distribution spools are equipped with internally heatable cartridge bores 22 and are shifted by the cylinder assemblies 45 and monitored by the proximity switches 43 to open and close the individual circumferential molten material passages 18.

It will be understood by those skilled in the art that each of the elements described above, or two or more together, may also be used in alternate methods of producing molded articles therein and in other apparatuses for the preparation of molded articles.

While the invention has been described in detail in the foregoing specification and drawing as embodied in the context of a single and multi-layer cascading compression method and apparatus for the preparation of molded articles, it will be appreciated that the description is not intended to be limited to the details shown and various modifications and structural changes may be made without departing from the spirit and scope of the invention.

What is claimed is:

1. Method for the fabrication of finished molded articles in a molding apparatus including a primary manifold assembly adapted with laterally grooved stationary primary and secondary distribution spools and stationary central nozzles;

a secondary manifold assembly adapted with secondary displacement plugs;

a fixed-volume multi-cavity mold assembly;

primary variable-volume transfer reservoirs; and secondary variable-volume transfer reservoirs;

which comprises the steps of (a) opening the primary distribution spools of the primary manifold assembly;

(b) sliding the primary manifold assembly with a plurality of programmable cylinders in an expanding motion on adjustable-length spacer rods;

(c) extruding molten material from a plasticizer along lateral longitudinal grooves in the stationary central nozzles and in the primary stationary displacement plugs intersecting with the molten material passages in the manifold block assembly into the primary transfer reservoirs during the programmable expanding motion of the primary manifold assembly;

(d) monitoring the volume of molten material in each primary transfer reservoir through adjustable compensation rods;

(e) closing the primary distribution spools;

(f) opening the secondary distribution spools in the primary manifold assembly;

(g) retracting the primary manifold assembly towards the stationary primary distribution plugs;

(h) retracting the secondary displacement plugs, connected to the primary manifold assembly, with the programmable cylinders;

(i) transferring molten material from the primary transfer reservoirs into the secondary transfer reservoirs across the secondary distribution spools and through the internal molten material passages in the secondary displacement plugs, wherein the secondary displacement plugs have off-center exit ports;

(j) shifting the secondary distribution spools upon completion of the transfer phase to close the molten material passage ways between the primary transfer reservoirs and the secondary transfer reservoirs;

(k) shifting the primary distribution spools again to open the molten material passage ways between the stationary central nozzle and the primary transfer reservoirs;

(l) sliding the primary manifold assembly together with the secondary displacement plugs on the adjustable-length spacer rods according to the desired transfer volume with the programmable cylinders away from the fixed-position primary displacement plugs and toward the fixed-volume mold cavity assembly;

(m) transferring the premetered molten material from the secondary transfer reservoirs into the fixed volume mold cavities condensing the molten material into finished molded articles with the foremost closed portion of the secondary displacement plugs;

(n) closing the gates of the mold cavities with the foremost portion of the secondary displacement plugs in their bottomed-out position;

(o) refilling independently the primary transfer reservoirs while filling, packing and holding the molten materials in the mold cavities monitored by means of positioned controlled external cylinder devices; and (p) repeating the aforementioned steps to produce an infinite number of finished molded articles.

2. Method for the fabrication of finished molded articles in a molding apparatus including a primary manifold assembly adapted with laterally grooved primary stationary displacement plugs of corresponding different diameters, primary distribution spools, secondary distribution spools and stationary central nozzles;

a secondary manifold assembly adapted with secondary displacement plugs of corresponding diameters;

a tertiary manifold assembly adapted with tertiary distribution spools;

a fixed-volume multi-cavity mold assembly;

primary variable-volume transfer reservoirs; and secondary variable-volume transfer reservoirs;

which comprises the steps of (a) opening the primary distribution spools within the primary manifold assembly;

(b) extruding different molten materials from a plurality of plasticizers through a plurality of stationary central nozzles via primary distribution spools;

(c) sliding the primary manifold assembly with a plurality of programmable cylinders in an expanding motion on adjustable-length spacer rods along the stationary nozzles;

(d) conveying the different molten materials along lateral grooves in the stationary central nozzles and in the primary stationary displacement plugs into a plurality of primary transfer reservoirs across molten material passage ways during the expanding motion of the primary manifold assembly, wherein the primary displacement plugs have different diameters to create different volume transfer reservoirs;

(e) monitoring the volume of the molten material in each primary transfer reservoir through adjustable compensation rods;

(f) closing the primary distribution spools;

(g) opening secondary distribution spools in the primary manifold assembly;

(h) retracting the primary manifold assembly sliding on adjustable-length spacer rods toward the fixed-position primary distribution plugs;

(i) retracting the secondary displacement plugs, connected to the primary manifold assembly with the programmable cylinders away from the stationary transfer housings in the secondary manifold assembly;

(j) transferring the molten materials from the primary transfer reservoirs into the secondary transfer reservoirs across secondary distribution spools and through the internal molten material passages in the secondary displacement plugs, wherein the secondary displacement plugs have center exit ports;

(k) shifting the secondary distribution spools upon completion of the transfer phase to close the molten material passageways between the primary transfer reservoirs and the secondary transfer reservoirs;

(l) opening a tertiary set of distribution spools located in the tertiary manifold assembly between the secondary manifold assembly and the mold cavity assembly;

(m) connecting the molten material passage ways from the secondary transfer reservoirs to a central tertiary distribution spool directly and to lateral tertiary distribution spools;

(n) extending the primary manifold assembly together with the secondary distribution plugs;

(o) transferring the different molten materials from the secondary transfer reservoirs via the tertiary distribution spools across the multilayer die crowns and die cones, both embedded in the central tertiary distribution spool into the mold cavities;

(p) continuing to expand the primary manifold assembly together with the secondary displacement plugs to condense the molten materials in the mold cavity assembly into finished multilayer molded articles;

(q) shifting the primary distribution spools again to open the molten material passage ways between the stationary central nozzles and the primary transfer reservoirs;

(r) extruding a new batch of different molten materials into the primary transfer reservoirs; and (s) shifting the tertiary distribution spools to close the gates of the fixed-volume mold cavities to open the mold cavity assembly and release the finished multilayer articles.

3. Method in accordance with claim 2 further comprising the steps of sliding the primary manifold assembly with the programmable transfer cylinders in an expanding motion on the adjustable-length spacer rods according to the desired molten material volumes and repeating the aforementioned steps to produce an infinite number of finished molded multilayer articles.

4. Molding apparatus for preparing finished molded articles including (a) a primary manifold assembly adapted with laterally grooved stationary primary displacement plugs, primary and secondary distribution spools and stationary central nozzles;

(b) a secondary manifold assembly adapted with secondary displacement plugs;

(c) a fixed-volume multi-cavity mold assembly;

(d) primary variable-volume transfer reservoirs; and (e) secondary variable-volume transfer reservoirs; said fixed-volume multi-cavity mold assembly being mounted in said molding apparatus such that the primary manifold assembly, together with the secondary displacement plugs within the secondary manifold assembly reciprocate between the multi-cavity mold assembly, the laterally grooved stationary primary displacement plugs and the stationary central nozzles of the primary manifold assembly, thereby facilitating the transfer reservoirs into the secondary variable-volume transfer reservoirs through internal molten material passages within the secondary displacement plugs in a continuous cascading flow during the retracting movement of the primary manifold assembly with the secondary displacement plugs.

5. Molding apparatus for preparing finished molded articles including (a) a primary manifold assembly adapted with laterally grooved primary stationary displacement plugs of corresponding different diameters, primary distribution spools, secondary distribution spools and stationary central nozzles;

(b) a secondary manifold assembly adapted with secondary displacement plugs of corresponding different diameters;

(c) a tertiary manifold assembly adapted with tertiary distribution spools;

(d) a fixed volume multi-cavity mold assembly;

(e) primary variable-volume transfer reservoirs; and (f) secondary variable-volume transfer reservoirs; said multi-cavity mold assembly being mounted in said molding apparatus so as to allow the primary manifold assembly, together with the secondary displacement plugs of corresponding different diameters mounted within the secondary manifold assembly to reciprocate between the mold-cavity assembly, the tertiary manifold assembly, and the fixed position of the laterally grooved primary stationary displacement plugs of corresponding different diameters mounted in the primary manifold assembly to transfer molten materials of different volume and different characteristics in a continuous cascading flow from the primary variable-volume transfer reservoirs through the internal molten material passage ways within the secondary displacement plugs into the secondary variable-volume transfer reservoirs during the retracting movement of the primary manifold assembly and the secondary displacement plugs.

6. Apparatus for producing finished molded articles in a molding machine including (a) a plurality of stationary central nozzles with lateral longitudinal grooves;

(b) a plurality of stationary displacement plugs with lateral longitudinal grooves;

(c) a plurality of variable-volume transfer reservoirs capable of receiving an amount of molten material;

(d) molten material passage ways disposed between said stationary central nozzles and said stationary displacement plugs within the plurality of variable-volume transfer reservoirs;

(e) intersecting molten material passage ways adapted to slide along their respective lateral longitudinal grooves during the reciprocating movement of the primary manifold block assembly;

(f) a primary set of distribution spools adapted to shift in a linear direction to open and close the molten material passage ways between said stationary central nozzles and the plurality of variable-volume transfer reservoirs;

(g) a manifold assembly incorporating the variable-volume transfer reservoirs and having a stationary portion and a movable portion;

(h) adjustable-length spacer rods mounted on the stationary portion of the primary manifold assembly to determine different volume requirements during operation;

(i) primary stationary displacement plugs, wherein the molten material is conveyed through the molten material passage ways from the central stationary central nozzles into the variable-volume transfer reservoirs on a continuous cascading basis, whereby in each case the side wall of the respective variable-volume transfer reservoir changes its position relative to the respective stationary displacement plug in each filling phase, and creates an extending movement of the manifold assembly;

(j) slidable compensation rods built into each primary stationary displacement plug to monitor the amount of the molten material in each reservoir to each other the slidable compensation rods being capable of retracting so that individual molten material transfer is monitored during the retracting movement of the manifold assembly;

(k) a secondary manifold assembly mounted onto the adjustable-length spacer rods, wherein the secondary manifold assembly being a stationary portion, and the secondary displacement plugs, mounted onto the primary manifold assembly, being the movable portion;

(l) programmable transfer cylinders mounted between the stationary portion of the primary manifold assembly and the movable portion of the primary manifold assembly;

(m) a secondary set of distribution spools shifting in a linear direction to open and close the molten material passage ways between said primary transfer reservoirs and the secondary manifold assembly;

(n) a secondary manifold assembly to intermittently store molten materials, transferred from the primary manifold assembly through the internal molten material passage ways of the secondary displacement plugs;

(o) a tertiary manifold assembly with tertiary lateral and central distribution spools to convey different molten materials from the secondary manifold assembly into the mold cavity assemblies;

(p) a plurality of multilayer crowns and die cones embedded in a central tertiary distribution spool to unite different molten materials from the secondary manifold assembly into a multilayer structure;

(q) a plurality of mold cavity assemblies with large bottom gate portions to convey the multilayer molten material structures at low shear rates from tunnel passage ways within the central tertiary distribution spools through the die crown which comprises a series of concentric ring gaps interrupted with intersecting inlet opening in their respective bottom bases across the die cones into the mold cavities to form finished multilayer articles, and wherein the movable portion of the primary manifold, together with the secondary displacement plugs, extends from the stationary portion of the primary manifold assembly with the programmable transfer cylinders;

wherein the adjustable-length spacer rods determine the maximum stroke length of the transfer cylinders and thus the total amount of the molten materials in the transfer reservoirs, and wherein the programmable transfer cylinders regulate the amount of molten material to be transferred into the primary transfer reservoirs and from there into the secondary transfer reservoirs and subsequently into the mold cavities.

* * * * *